US006638166B2

(12) United States Patent
Hedrick et al.

(10) Patent No.: US 6,638,166 B2
(45) Date of Patent: Oct. 28, 2003

(54) EXTENDABLE BET BUTTON

(75) Inventors: Joseph R. Hedrick, Reno, NV (US); Jean Pierre Legras, Reno, NV (US); Noel D. Brodzinski, Reno, NV (US)

(73) Assignee: International Game Technology, Reno, NV (US)

(*) Notice: Subject to any disclaimer, the term of this patent is extended or adjusted under 35 U.S.C. 154(b) by 0 days.

(21) Appl. No.: 10/200,360

(22) Filed: Jul. 22, 2002

(65) Prior Publication Data

US 2003/0003982 A1 Jan. 2, 2003

Related U.S. Application Data

(63) Continuation of application No. 09/679,753, filed on Oct. 5, 2000.

(51) Int. Cl.[7] ........ A63F 13/00

(52) U.S. Cl. ........ 463/20

(58) Field of Search ........ 463/20, 25, 37, 463/38, 46, 47, 16; 273/148 B; 191/12 R, 12.2 R

(56) References Cited

U.S. PATENT DOCUMENTS

| | | | | |
|---|---|---|---|---|
| 3,980,808 A | | 9/1976 | Kikuchi et al. | 174/110 SR |
| 5,168,969 A | * | 12/1992 | Mayhew | 191/12.2 R |
| 5,232,191 A | | 8/1993 | Infanti | 248/500 |
| 5,351,507 A | * | 10/1994 | Derman | 70/18 |
| 5,651,735 A | * | 7/1997 | Baba | 463/18 |
| 5,676,231 A | | 10/1997 | Legras et al. | 194/206 |
| 5,951,397 A | | 9/1999 | Dickinson | 463/36 |
| 6,162,995 A | | 12/2000 | Bachle et al. | 174/151 |
| 6,223,622 B1 | | 5/2001 | Ficyk et al. | 74/502 |
| 6,270,410 B1 | | 8/2001 | DeMar et al. | 463/20 |

FOREIGN PATENT DOCUMENTS

| | | | | |
|---|---|---|---|---|
| JP | 10-328397 | * | 12/1998 | 7/2 |

* cited by examiner

*Primary Examiner*—Kim Nguyen
(74) *Attorney, Agent, or Firm*—Marshall, Gerstein & Borun LLP

(57) ABSTRACT

A gaming machine with an extendable bet button is disclosed. In most known gaming machines, the bet button is the most often accessed control of the gaming machine. In order to improve player comfort, an extendable bet button is provided which enables a player to lean back while playing a gaming machine to provide increased player comfort. The extendable bet button may be carried by the front housing portion in an non-extended position similar to conventional gaming machines. The extendable bet button is connected to the gaming machine by way of an electrical cable which allows the extendable bet button to be pulled away form the machine to improve player comfort. A stop assembly is provided to prevent the extendable bet button from being pulled out of the machine. The electrical cable may be provided as an armored cable to prevent unauthorized access as well as protect the cable from wear.

14 Claims, 13 Drawing Sheets

EXTENDABLE BET BUTTON

CROSS-REFERENCE TO RELATED APPLICATIONS

This application is a continuation of copending application Ser. No. 09/679,753, filed Oct. 5, 2000, and is also related to the following commonly-owned co-pending utility patent applications: "Next Generation Video/Reel Product," by Jean Pierre Legras and Joseph R. Hedrick, Ser. No. 09/680,108; "Integrated Foot Rests," by Joseph R. Hedrick and Jean Pierre Legras, Ser. No. 09/679,754, now U.S. Pat. No. 6,422,670; "Dual Action Door Hinging," by Joseph R. Hedrick, Jean Pierre Legras and Noel D. Brodzinski, Ser. No. 09/679,751, now U.S. Pat. No. 6,474,758; and a design patent application entitled "Gaming Machine," by Joseph R. Hedrick and Jean Pierre Legras, Serial No. 29/130,606. now U.S. Pat. No. D451150, all filed on Oct. 5, 2002.

BACKGROUND OF THE INVENTION

1. Field of the Invention

The present invention relates to gaming machines and more particularly to a gaming machine with an extendable bet button to provide increased player comfort.

2. Description of the Prior Art

Various types of gaming machines are known. When playing such gaming machines, players normally sit at a chair or stool in front of the gaming machine, rigidly mounted a fixed distance from the gaming machine, for example, as disclosed in U.S. Pat. Nos. 5,232,191 and 5,762,617. The location of the gaming machine controls, for example, results in the player either leaning or being hunched forward. In order to improve player comfort, some known gaming machine stools come with footrests or a foot rail to enable players to rest their feet. However, the position of the gaming controls, for example, rigidly mounted thereto as shown in U.S. Pat. No. 5,951,397, requires players to lean or hunch forward during play. Continued play in a hunched position can cause player discomfort and fatigue. Such fatigue and discomfort thus limits the amount of time player will play a gaming machine. Unfortunately, due to the configuration of the machine, there is little a player can do to change positions. Thus, there is a need for an improved gaming machine which provides improved player comfort.

SUMMARY OF THE INVENTION

According to one aspect, the disclosed gaming machine may include a housing having a front housing portion having an aperture of a first dimension and a grommet disposed therein. The gaming machine may also include gaming machine electronics associated with the housing and a remote bet button, which may include a push button switch disposed within a cylindrical member that may have a first portion having a second dimension smaller than the first dimension and a second portion having a third dimension larger than the first dimension. In such an arrangement, the remote bet button adapted to fit in the aperture in abutment with the grommet when the remote bet button is in an unextended position. Such a push button switch may allow a user to make a wager on a video gambling game. The gaming machine may also include an armored cable having a first end coupled to the push button switch and extending through the aperture in the front housing portion and a second end coupled to the gaming machine electronics. The armored cable could move through the aperture and have a length that allows the remote bet button to move from the unextended position to an extended position. Additionally, the gaming machine may include a stop assembly disposed within the housing. The stop assembly may include a bracket defining an access area through which the armored cable may pass and a weight attached around the armored cable and disposed between the bracket and the second end of the armored cable. In such an arrangement, a dimension of the weight may be larger than a dimension of the access area of the bracket. The gaming machine may further include a video display associated with the housing and adapted to display video gambling game images and may also include a value accepting device associated with the housing and adapted to accept value to be wagered on an outcome of the video gambling game, along with a control panel associated with the housing that could allow a user to control the video gambling game.

According to a second aspect, the disclosed gaming machine may include a housing that may have a front housing portion with an aperture of a first dimension therein. The gaming machine may also include a seating unit associated with the housing, the seating unit enabling a user to sit in an upright position in which the housing is within reach of the user and enabling the user to sit in a reclined position in which the housing is not within reach of the user. Further, the gaming machine may include gaming machine electronics associated with the housing and an extendable bet button that allows the user to initiate play of a video gambling game from the reclined position, the extendable bet button comprising a portion having a second dimension larger than the first dimension, the extendable bet button adapted to move between an unextended position and an extended position. Additionally, the gaming machine may include a cable coupled to the extendable bet button and extending through the aperture in the front housing portion, the extendable bet button being operatively coupled to the gaming machine electronics, the cable having a length allowing the extendable bet button to be moved from the unextended position to the extended position. In such an arrangement, the cable may move through the aperture in the front housing portion when the extendable bet button is moved between the unextended position and the extended position. The gaming machine may further include a video display associated with the housing and adapted to display video gambling game images and a value accepting device associated with the housing and adapted to accept value to be wagered on an outcome of the video gambling game.

According to a third aspect, the disclosed gaming machine may include a housing including an aperture of a first dimension, gaming machine electronics associated with the housing, a control panel associated with the housing and operatively coupled to the gaming machine electronics, the control panel including a number of input devices that allow a user to control a video gambling game and a cable coupled to the gaming machine electronics and extending through the aperture. The gaming machine may also include a push button switch coupled to the gaming machine electronics through the cable, wherein the cable has a length that allows the push button switch to be moved from an unextended position to an extended position, the push button switch allowing the user to initiate play of the video gambling game without having to utilize the control panel. Additionally, the gaming machine may include a cable retention unit associated with the housing, the cable retention unit comprising a bracket defining an access area through which the cable passes and a weight attached to the cable and disposed between the bracket and the gaming machine electronics, wherein a dimension of the weight is larger than a dimension of the access area of the bracket. Further, the gaming machine may include a video display associated with the housing and adapted to display video gambling game images and a value accepting device associated with the housing and adapted to accept value to be wagered on an outcome of the video gambling game.

BRIEF DESCRIPTION OF THE DRAWING

These and other advantages of the present invention will be apparent from the following description and attached drawing wherein.

DETAILED DESCRIPTION

Figure 21:
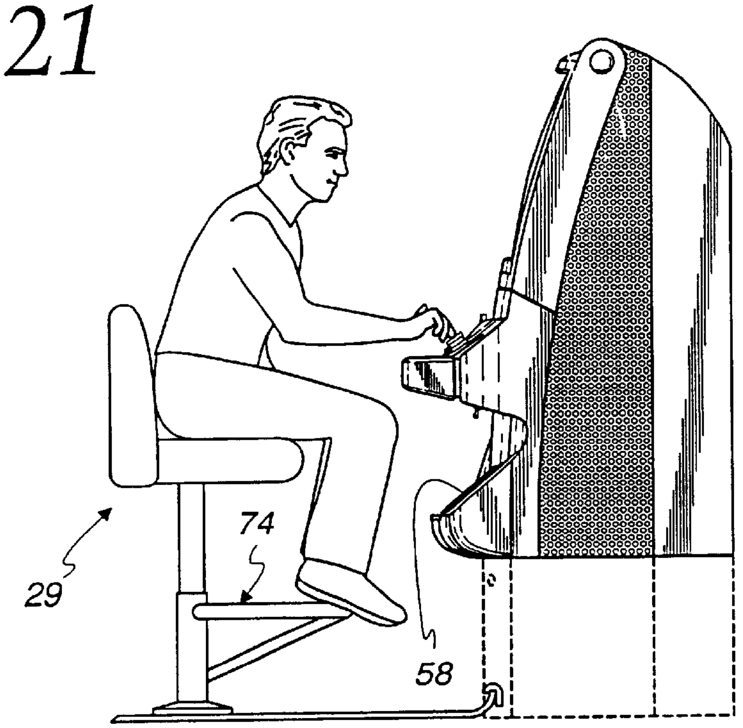
FIG. 21 is a side-elevational view of the gaming machine housing illustrated in FIG. 1, shown with a player and a bet button in a normal position.
Figure 22:
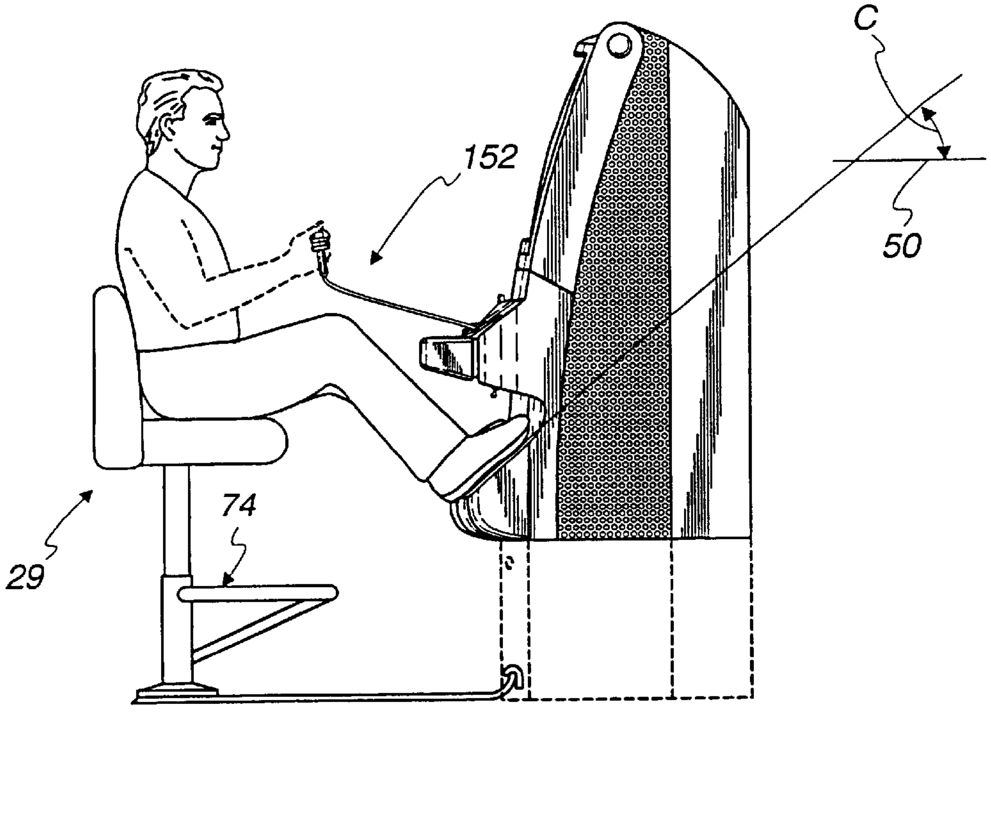
FIG. 22 is similar to FIG. 21 but with the bet button in an extended position and the player in a laid back position.

The present invention relates to an improved gaming machine housing. FIGS. 1–8 illustrate an improved configuration for a gaming machine which provides improved player comfort and also a smaller footprint to optimize the number of gaming machines that can be placed in a given area on a casino floor. FIG. 9 illustrates a cluster of the gaming machines illustrated in FIGS. 1–8 organized in a circular configuration. FIGS. 10–20 relate to an improved door support for an access door for the machine which enables gaming machines to placed closer together. FIGS. 21–24 relate to an extendable bet button for improving player comfort. FIGS. 1–3 and 6 illustrate a footrest that is integrated into the front housing portion which together with a remote bet button improves player comfort as generally shown in FIG. 22.

Improved Gaming Machine Configuration

As best shown in FIGS. 1–8, an improved gaming machine housing configuration, in accordance with the present invention, provides improved player comfort while at the same time provides a relatively small footprint to optimize the number of gaming machines that can occupy a given area on a casino floor. As shown, the gaming machine housing, in accordance with the present invention, generally identified with the reference numeral 30, may be provided with an integral or separate pedestal 32. The height of the pedestal 32 is selected so that the height of the player controls and video display surface are compatible with a standard gaming machine stool 29 (FIGS. 21, 22), for example, as manufactured by Gary Platt Manufacturing Inc. or as disclosed in U.S. Pat. No. 5,232,191, hereby incorporated by reference.

Figure 1:
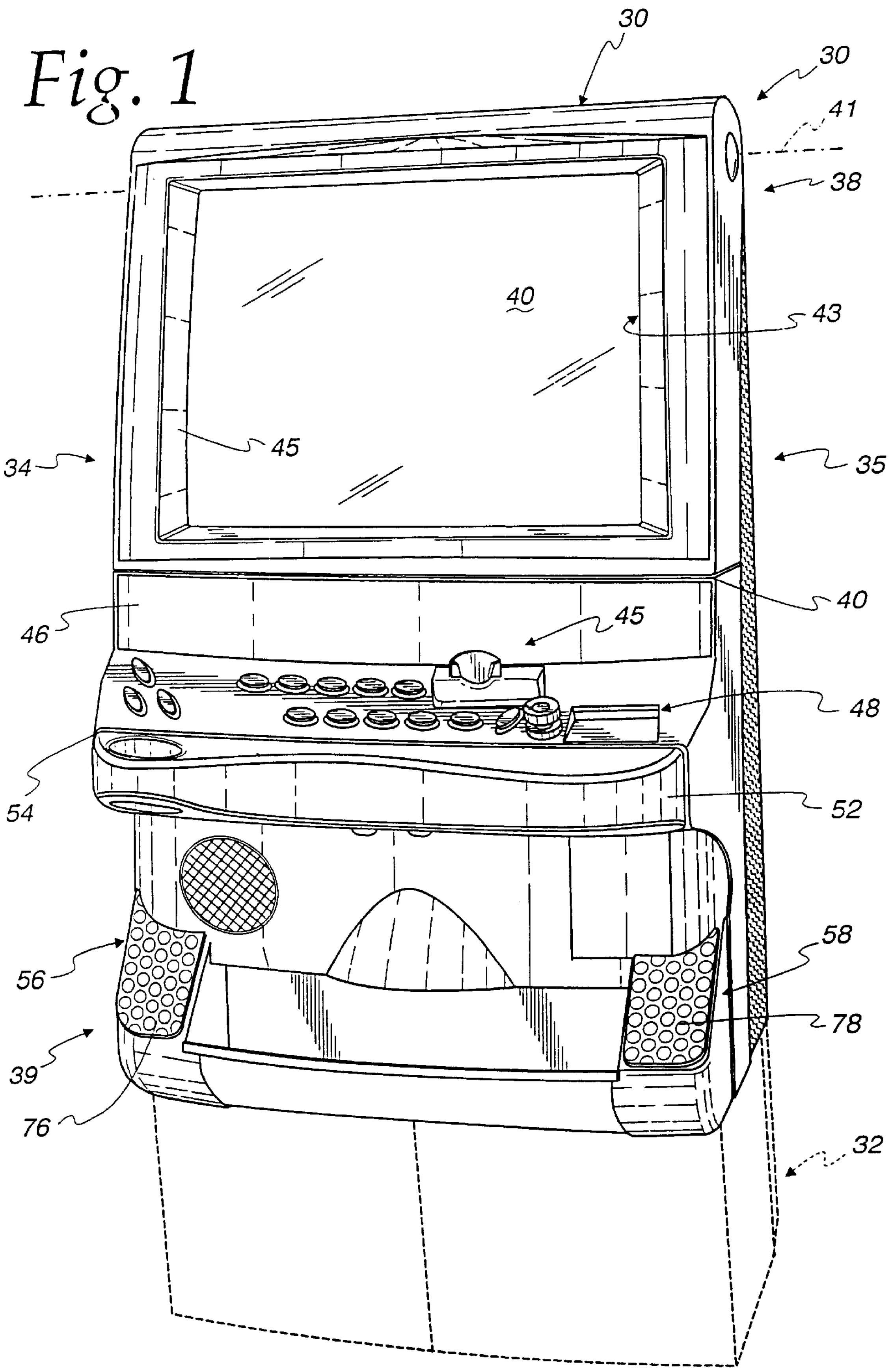
FIG. 1 is a front perspective view of an exemplary embodiment of a gaming machine housing, in accordance with the present invention, shown sitting or a pedestal, illustrated in phantom.
Figure 2:
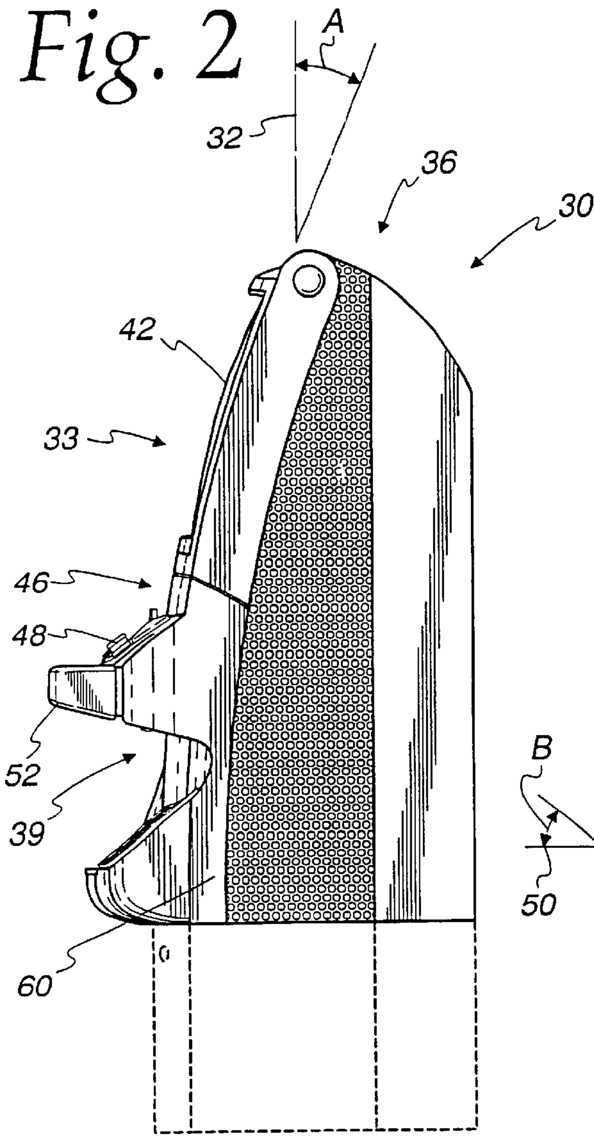
FIG. 2 is a perspective view of the left side of the gaming machine housing illustrated in FIG. 1.
Figure 3:
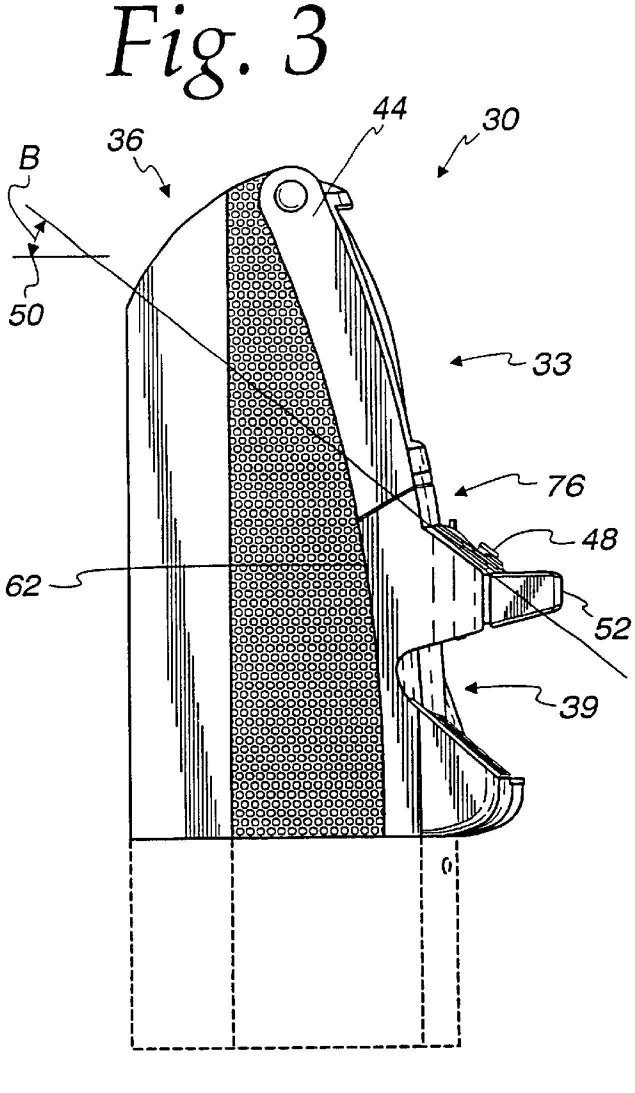
FIG. 3 is a perspective view of the right side of the gaming machine housing illustrated in FIG. 1.
Figure 4:
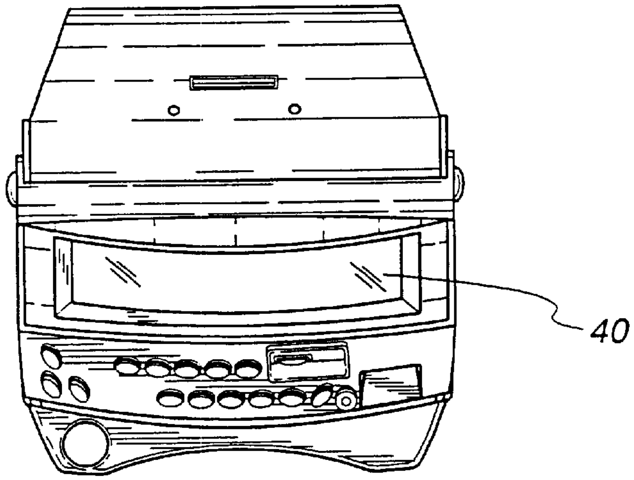
FIG. 4 is top perspective view of the gaming machine housing illustrated in FIG. 1.

As best shown in FIGS. 1–3, the gaming machine housing 30 is of irregular shape and is configured to enable the video display 40 to be carried in a plane at an angle A (FIG. 2), relative to a vertical datum 32. The angle A is selected to improve player comfort in a manner similar to that of a conventional slant top machine while at the same time providing the type of visibility of the video display 40 as conventional upright gaming machines. The angle A may be varied from about 5° to 85°, preferable between 20° and 40°, relative to the vertical datum 32 (FIG. 2). In accordance with another important aspect of the invention, the sides of the housing are formed at least in part to converge toward one another. Such a configuration reduces the footprint of the machine in order to optimize the number of gaming machines that can be placed in a given area on a casino or other gambling facility floor.

Figure 10:
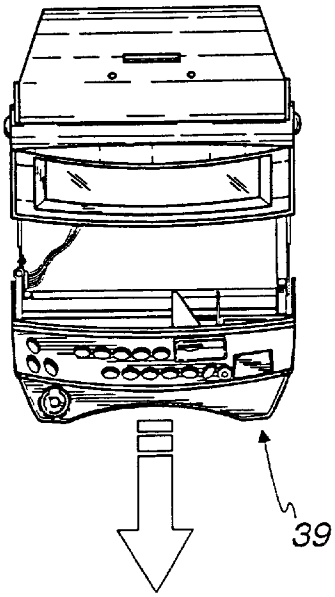
FIG. 10 is a top perspective view of the gaming machine housing illustrated in FIG. 1, shown with a door chassis, in accordance with one aspect of the present invention, in an extended position and the door in closed position.
Figure 11:
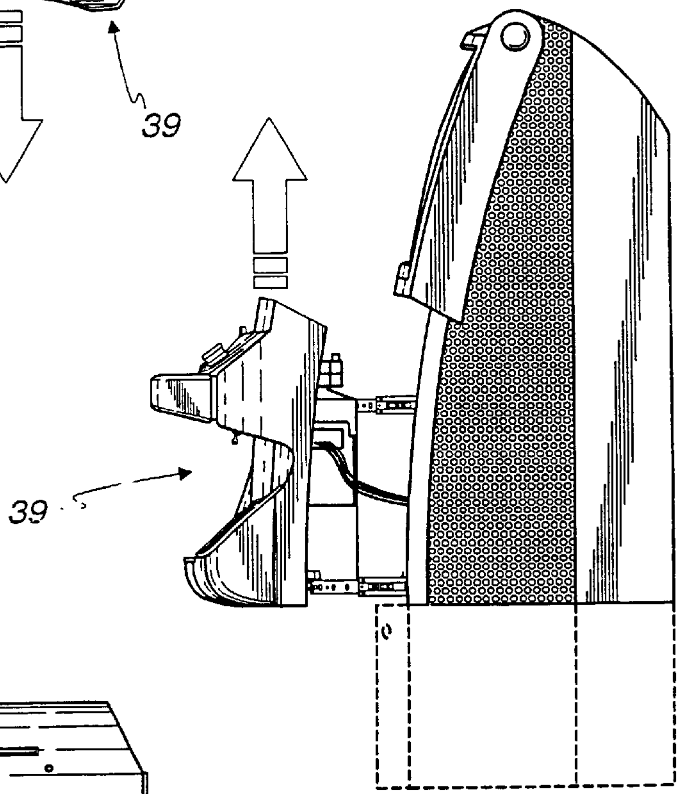
FIG. 11 is similar to FIG. 10 except that it is a side-perspective view.
Figure 12:
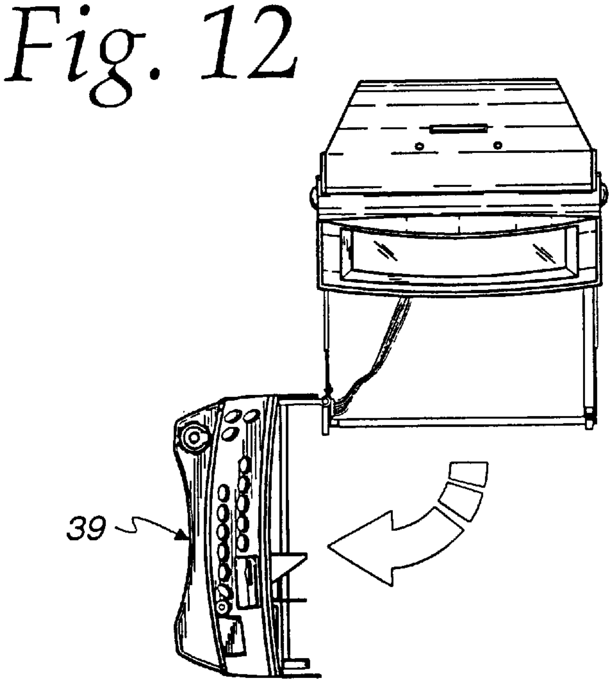
FIG. 12 is a top perspective view of the gaming machine housing illustrated in FIG. 1, shown with door chassis in an extended position and the door in an open position.

In accordance with an important aspect of the gaming machine housing, the lower front housing portion 39 may be mounted to the gaming machine in a manner to enable it to be pulled out to an extended position as generally shown in FIGS. 10 and 11 and to pivot as generally shown in FIG. 12 from the extended position. This configuration allows gaming machines to be placed closer together while at the same time providing full access to the interior of the gaming machine.

Figure 5:
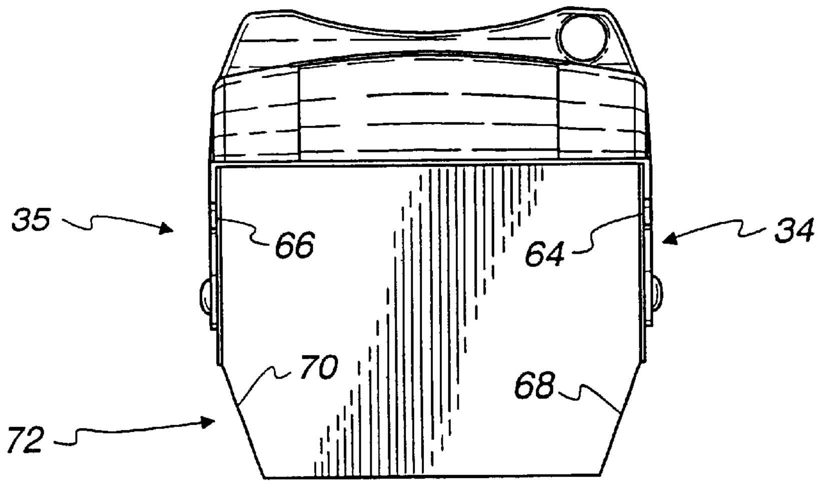
FIG. 5 is a bottom perspective view of the gaming machine housing illustrated in FIG. 1.
Figure 6:
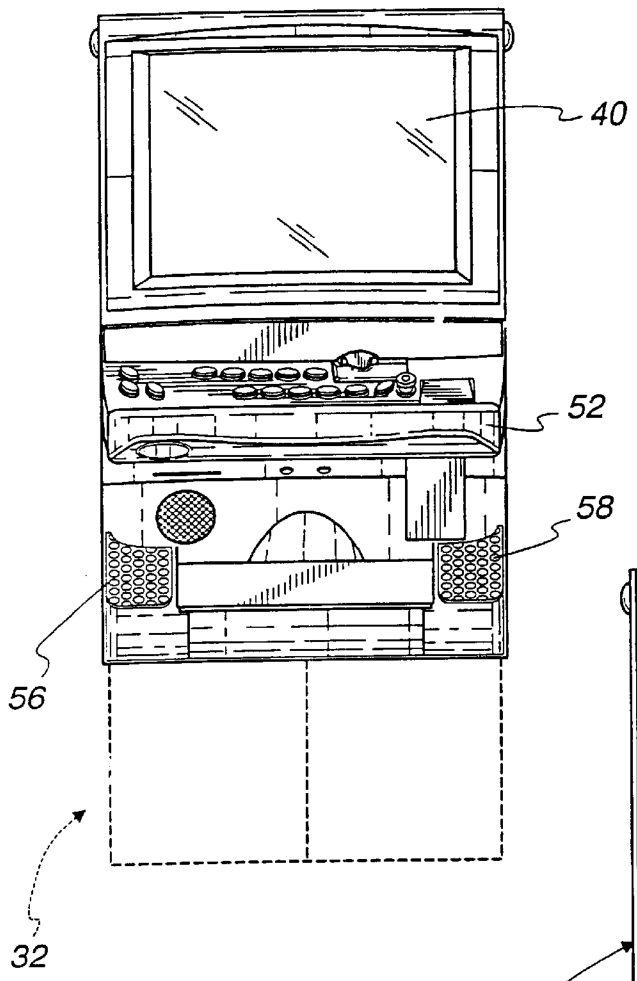
FIG. 6 is a front-elevational view of the gaming machine housing illustrated in FIG. 1.
Figure 7:
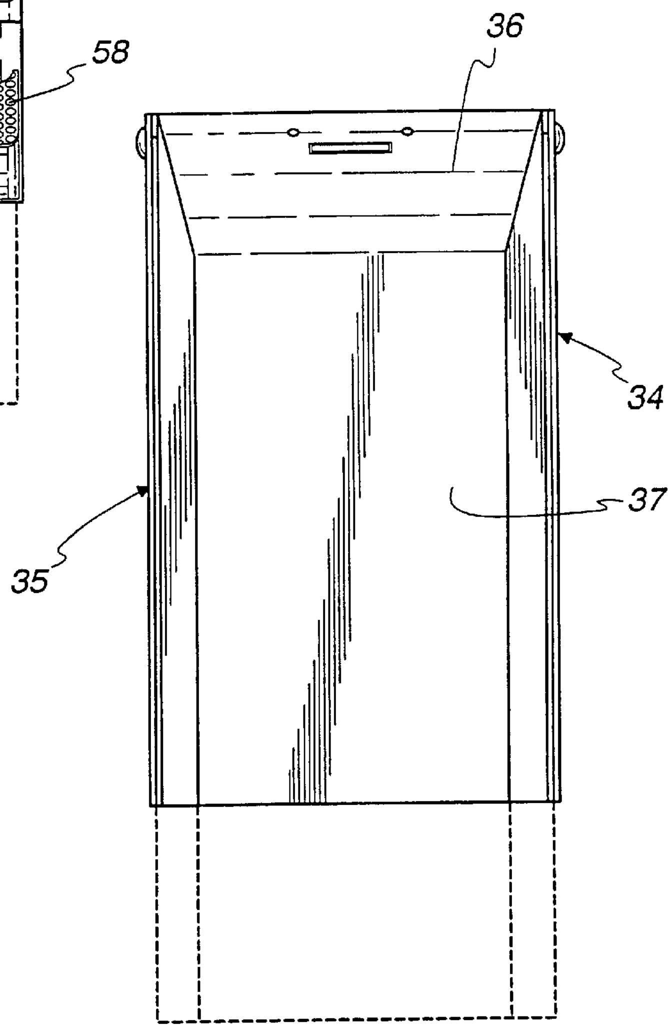
FIG. 7 is a rear-elevational view of the gaming machine housing illustrated in FIG. 1.
Figure 8:
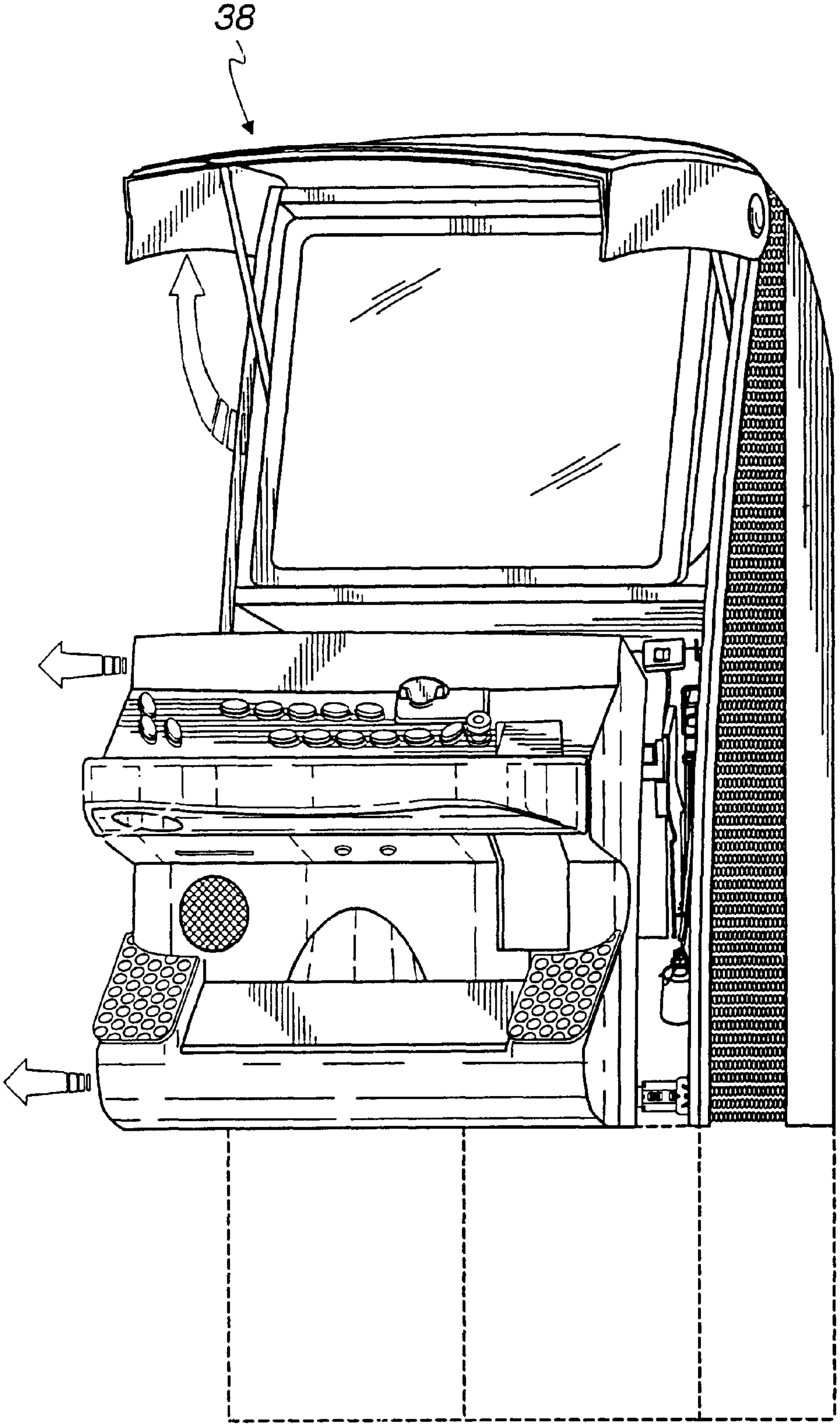
FIG. 8 is a front perspective view of the gaming machine housing illustrated in FIG. 1, shown with an upper front housing portion in an open position and the lower front housing portion partially pulled out.
Figure 9:
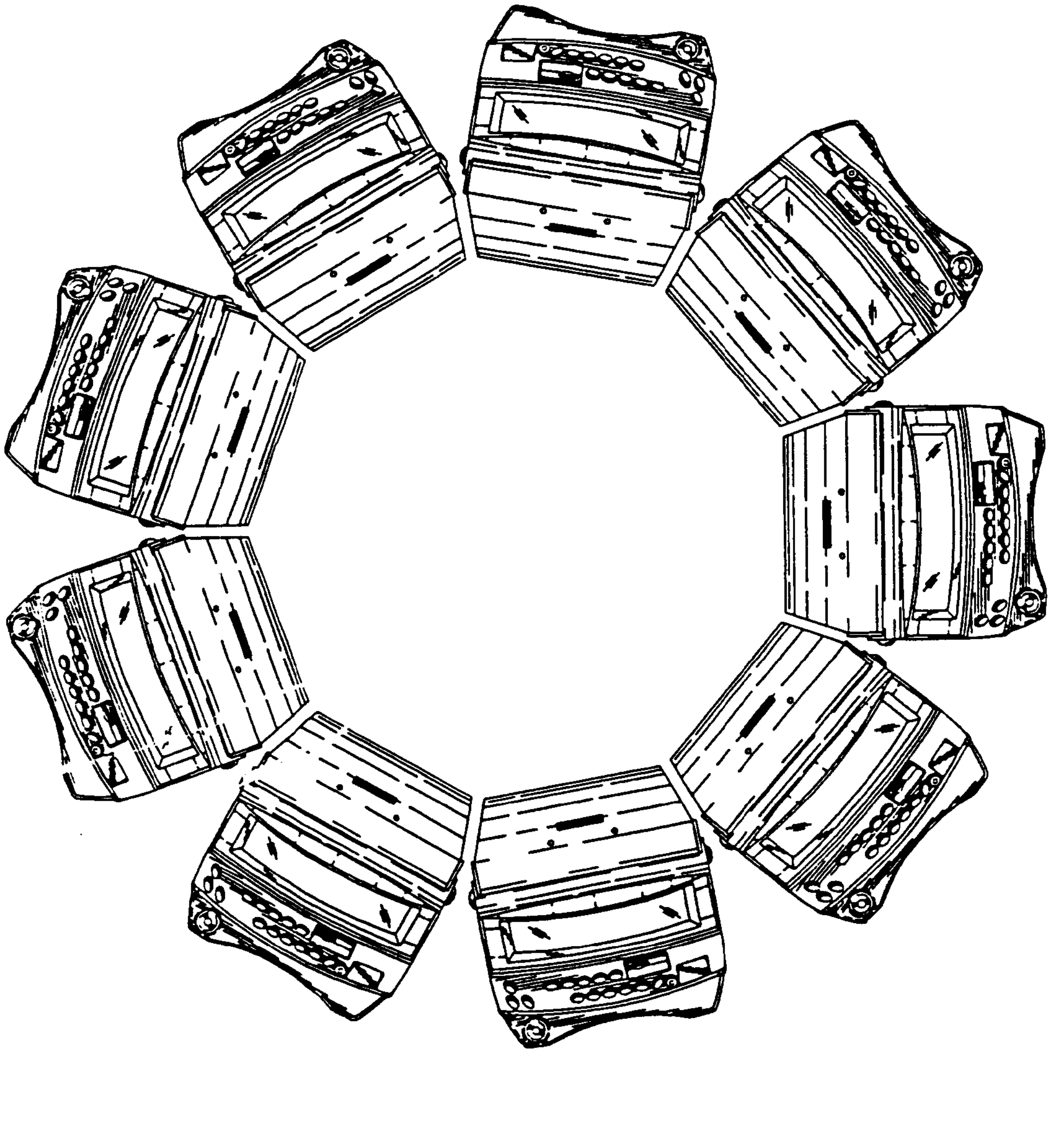
FIG. 9 is a top view of a circular cluster of gaming machine housing in accordance with the present invention illustrated in FIG. 1.

Referring to FIGS. 1–8, an exemplary gaming machine housing 30 is illustrated which includes a front housing portion 33 (FIGS. 2 and 3), left and right side housing portions, 34 and 35, respectively (FIGS. 1, 5 and 7), a top housing potion 36 (FIG. 7), a rear housing portion 37 (FIG. 7) and a bottom housing portion 72 (FIG. 5). The front housing portion 33 (FIGS. 2 and 3) may be divided into an upper front housing portion 38 (FIGS. 1 and 8) and a lower front housing portion 39 (FIG. 1). The upper front housing portion 38 may be pivotally mounted, for example, about a pivot axis 41 to enable the upper front housing portion 38 to be pivoted from a closed position, as shown in FIG. 1, to an open position, as shown in FIG. 8, to provide access to the video display 40 (FIG. 1) for maintenance and replacement. In order to prevent unauthorized access into the gaming machine 30, a latch or other locking arrangement (not shown) may be is used to secure the upper front housing 38 in a latched position as shown in FIG. 1.

The upper front housing portion 38 is used to frame a video display 40, for example, a cathode ray tube video display. As such, the upper front housing portion 38 is provided with a central rectangular aperture 43, sized in accordance with the dimensions of the video display 40, and formed with beveled surfaces 45 around the rectangular aperture 43 to frame the video display 40 and eliminate any gaps between the video display 40 and the upper front housing portion 38. The upper front housing portion 38 may also be formed with extending sidewalls 42, 44 (FIGS. 2 and 3) adapted to overlap the left and right side housing portions 34 and 35, respectively, in a closed position as shown in FIGS. 2 and 3.

The upper front housing portion 38 is used to frame a video display 40, for example, a cathode ray tube video display. As such, the upper front housing portion 38 is provided with a central rectangular aperture 43, sized in accordance with the dimensions of the video display 40, and formed with beveled surfaces 45 around the rectangular aperture 43 to frame the video display 40 and eliminate any gaps between the video display 40 and the upper front housing portion 39. The upper front housing portion 38 may also be formed with extending sidewalls 42, 44 (FIGS. 2 and 3) adapted to overlap the left and right side housing portions 34 and 35, respectively, in a closed position as shown in FIGS. 2 and 3.

The lower front housing portion 39 is formed with a first surface 46 (FIGS. 1–3). The angle of the first surface 46 is selected so that it is coplanar with the upper front housing portion 38, as best shown in FIGS. 2 and 3. The lower front housing portion 39 may also be provided with a second surface 48 that is not parallel to the plane of the first surface 46. The second surface 48 may be generally planar and configured at an angle B (FIG. 3) with respect to a horizontal datum 50. The angle B is selected to promote player comfort and minimize player fatigue, for example, an acute angle in the range from 10° to 70°, preferably 25° to 45°. As best shown in FIGS. 2 and 3, the lower front housing portion 39 may be provided with sidewalls 60 and 62. These sidewalls 60 and 62 overlap the left and right side housing portions 34 and 35 in a closed position, as shown in FIGS. 1–3.

An integral or separately formed convenience shelf 52 (FIGS. 1–3) may be provided which extends generally parallel relative to the horizontal datum 50 (FIG. 2). The convenience shelf 52 may be provided with a cup holder 54 and provide shelf space for the convenience of the players.

In accordance with an important aspect of the invention, the left and right side housing portions 34 and 35 are configured to reduce the overall footprint of the gaming machine. As best shown in FIGS. 2, 3 and 5, the left and right side housing portions 34 and 35 are formed to be generally symmetric and non-planar in configuration. In particular, referring to FIG. 5, the left and right side housing portions 34 and 35 are formed with generally parallel surfaces 64 and 66, respectively, and converging angled surfaces 68 and 70, respectively. As such, as shown in FIG. 5, the footprint of the machine is not rectangular but includes a trapezoidal portion, generally identified with the reference numeral 72, which enables the gaming machines to be arranged in various configurations including the circular configuration illustrated in FIG. 9 to enable more gaming machines to be located in a given area on a casino floor or other gaming facility.

Integrated Footrests

Normally, footrests are provided on gaming machine stools. In order to increase player comfort, a pair of footrests 56, 58 (FIGS. 1–3) are provided on the lower front housing portion 39 of the housing 30. These footrests 56, 58 may be integrally formed in the lower front housing portion 39 of the housing or formed separately and rigidly secured thereto. As shown best in FIGS. 1–3, the footrests 56, 58 are formed near the bottom of the lower front housing portion 39 on each end. As shown in FIGS. 1 and 2, the integrated footrests 56 and 58 are located at a height above the height of the footrests 74 (FIGS. 21, 22) provided on the game chair 29. The integral footrests 56 and 58 located on the lower front housing portion 39 provide increased player comfort by enabling a player to lean back and rest their feet as the game is played, as shown in FIG. 22.

The footrests 56, 58 are formed from angled surfaces, for example, at an angle C (FIG. 22) relative to a horizontal datum 50. The angle C is selected to optimize player comfort, for example between 20°–70°. As best shown in FIG. 1, the footrests 56, 58 may be provided with rubber pads 76 and 78, which may be secured to the footrests 56 and 58 with a suitable adhesive.

Dual Action Door Hinging

Access doors are normally provided on the front of gaming machines to provide access to the interior of the machine for in-situ maintenance and repair of the gaming machine on the casino floor. Such access doors limit how close gaming machines may be placed on a casino floor. More specifically, access doors normally are provided on the lower front portion of the gaming machine. Such access doors are normally hinged on one end. Unfortunately, the configuration of such gaming machines limits how close gaming machines can be placed while still enabling the access door to be fully opened. In particular, in many known gaming machines, the player controls are carried by an outwardly extending surface which extends outwardly relative to the plane of the access door. Such a configuration requires a certain amount of spacing between the machines in order for the access door to have sufficient clearance to be fully opened. In order to minimize the spacing between gaming machines, a dual-action access door in accordance with the present invention is provided which allows gaming machines to be placed relatively close together while at the same time providing the full access to the interior of the machine. In particular, FIGS. 10–20 illustrate a dual-action door assembly that enables the lower front housing portion 39 to be opened much like a file cabinet drawer from a closed position, as generally shown in FIG. 1, to an extended position as shown in FIGS. 10 and 11. Provisions are also provided to enable the lower front housing portion 39 to pivot in an extended position as shown in FIG. 12 to enable full access to the interior of the gaming machine for in-situ maintenance.

Figure 14:
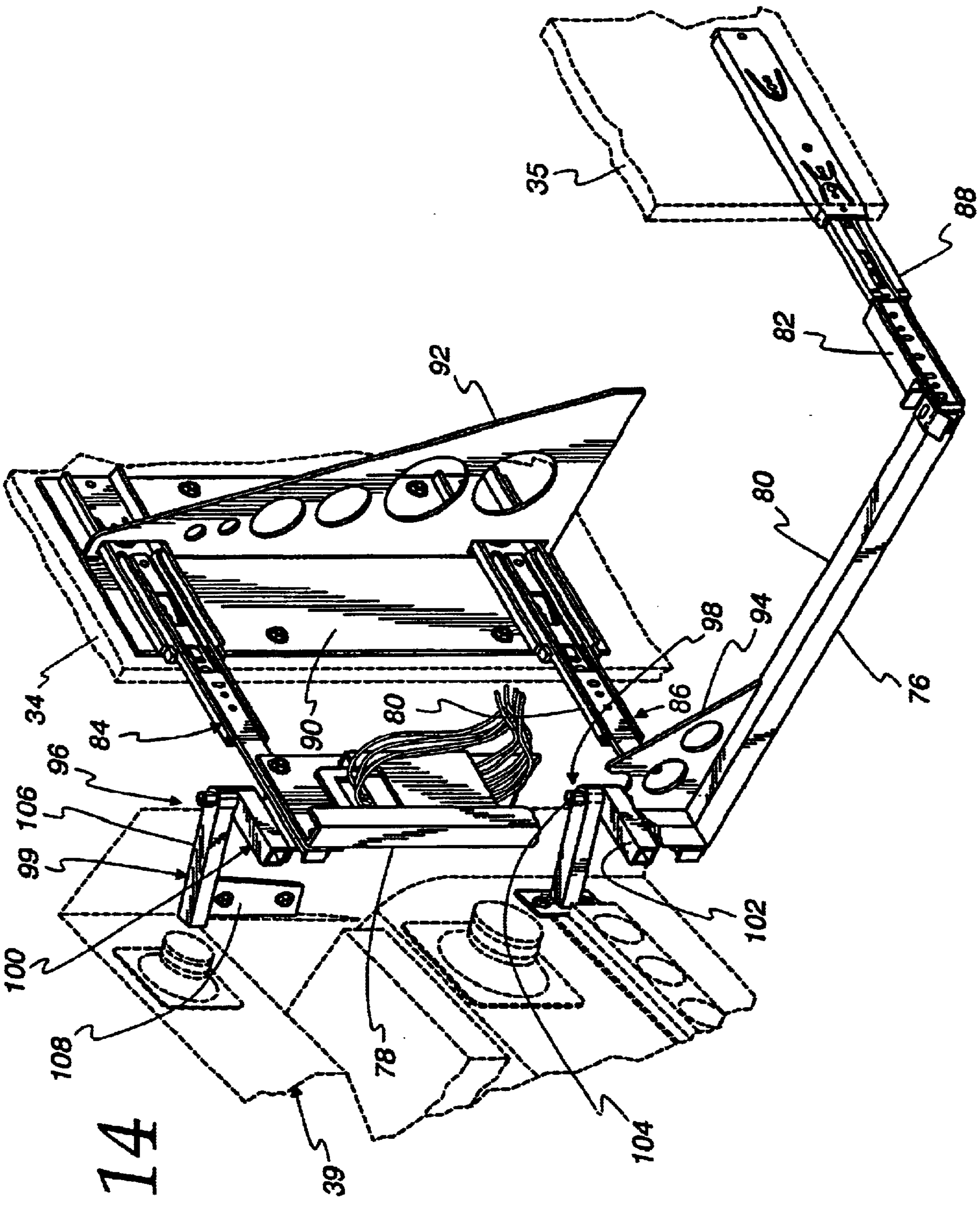
FIG. 14 is similar to FIG. 13 but with portions of the gaming machine and door chassis removed to more clearly illustrated the door chassis and door hinges.

Referring to FIG. 14, the lower front housing portion 39 is carried by a door chassis assembly, generally identified with the reference member 76. The door chassis assembly 76 includes a vertical frame member 78 and two horizontal frame members 80 and 82. The vertical frame member 78 and one of the horizontal frame members 80 are joined together at their respective ends to form an L-shaped configuration, generally parallel to the vertical datum 32 (FIG. 2). An opposing end of the horizontal frame 80 (FIG. 14) is connected to one end of the horizontal frame member 82 forming an L-shaped configuration, generally parallel to horizontal datum 50 (FIG. 3). Three telescoping drawer rails, 84, 86 and 88 are rigidly secured on one end to the frame members 78 and 82, for example, with suitable fasteners or by welding.

The horizontal frame members 80 and 82 may be formed with generally square or rectangular cross-sections. However, frame member 78 may be formed from J-channel for additional stiffening. The telescoping drawer rails 84 and 86 are rigidly attached to one end to the vertical frame member 78 with suitable fasteners. The drawer rail 88 is attached on one end to the horizontal frame member 82. The opposing ends of the drawer rails 84, 86 and 88 are attached to the interior of the left and right housing portions 34 and 35 with suitable fasteners. In order to provide additional stiffening, stiffening plates may be used. For example, a stiffening plate 90 may be attached directly to the interior of the left side housing portion 34 with suitable fasteners. The drawer rails 84 and 86 may then be attached to the stiffening plate 90.

Figure 13:
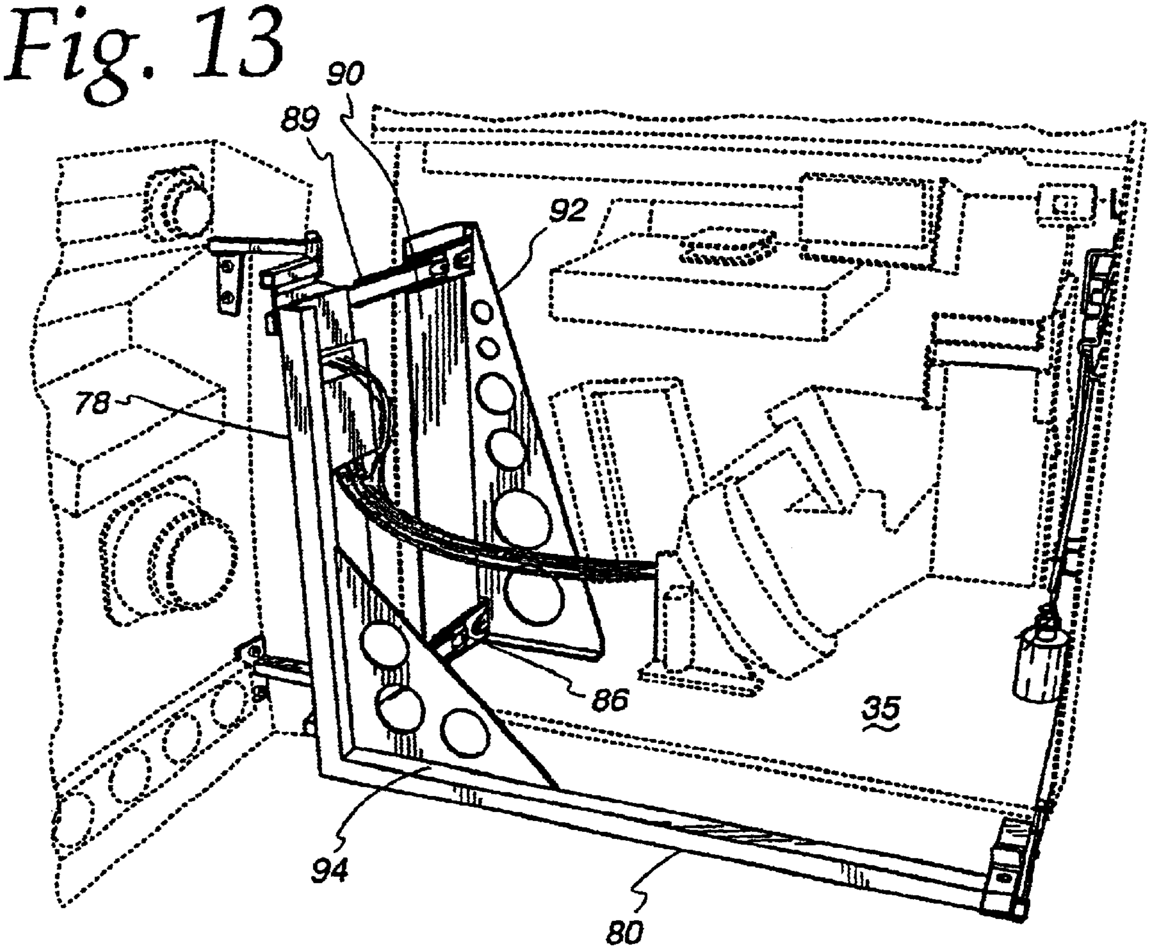
FIG. 13 is a partial perspective view of the gaming machine housing illustrated in FIG. 1, illustrated with the door chassis in an extended position and the door in an open position and shown with the interior of the gaming machine in phantom.

In order to provide additional stiffening, a gusset plate 92 may be rigidly attached to the stiffening plate 90 and rest on the bottom housing portion 72 (FIG. 5) as shown in FIGS. 13 and 14. An additional gusset plate 94 may be rigidly secured in the corner of the vertical frame member 78 and the horizontal frame member 80. The gusset plate 94 provides additional stiffening of the door chassis 76.

The door chassis assembly 76 enables the lower front housing portion 39 to slide out in a similar manner to a file drawer from a closed position as shown in FIG. 1 to an extended position as shown in FIGS. 10 and 11. In accordance with another aspect of the invention, the lower front housing portion 39 is pivotally mounted on one end about an axis generally parallel to a vertical datum 32 (FIG. 2). The pivotal mounting enables the lower front housing portion 39 to pivot from a closed position when the door chassis assembly 76 is in a partially or fully extended position as shown in FIGS. 10 and 11 to an open position as shown in FIG. 12, thus providing a dual-action door.

In order to pivotally mount the lower front housing portion 39 relative to the door chassis 76, upper and lower hinge assemblies 96 and 98 are provided. Each hinge assembly 96, 98 includes two brackets 99, 100. The brackets 99 are rigidly attached to the interior of the front housing portion 39 while the brackets 100 are attached to the vertical support 78. Each of the brackets 99 are formed from a horizontal member 102 and a pin 104 configured to be generally parallel to the vertical datum 32 (FIG. 2) when secured to the vertical supports 78 defining a vertical pivot axis. The brackets 100 are formed from a pair of members 106, 108 configured in a generally L-shape. The members 106 are provided with apertures (not shown) for receiving the pins 104 to enable the lower front housing portion 39 to pivot about a vertical axis on the left side of the lower front housing portion 39.

The right side of the lower front housing portion 39 is secured by upper and lower latch assemblies 110 and 112 respectively. The upper latch assembly 110 is illustrated in FIGS. 19 and 20 while the lower latch assembly 112 is illustrated in FIGS. 15–17.

Figure 15:
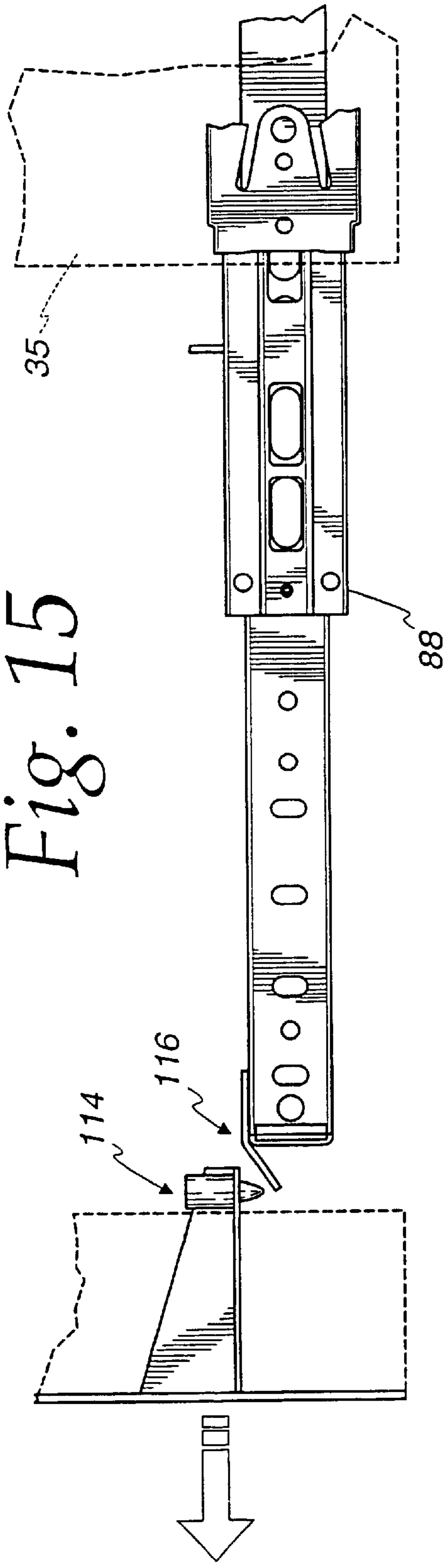
FIG. 15 is a partial elevational view illustrating the door rail which forms a part of the door chassis in an extended position.
Figure 17:
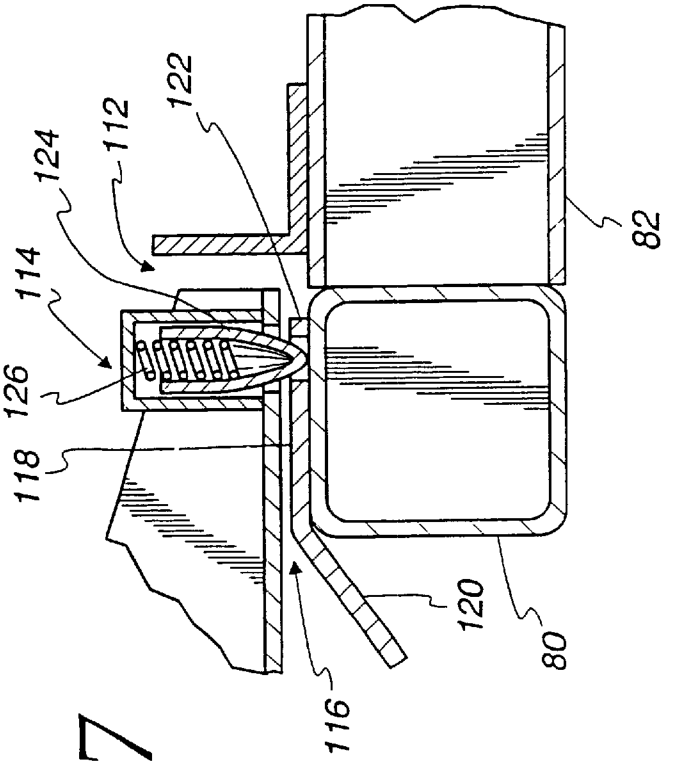
FIG. 17 is a partial sectional view of a position of the door chassis, shown with the door closed, illustrating the bottom door latch assembly.
Figure 16:
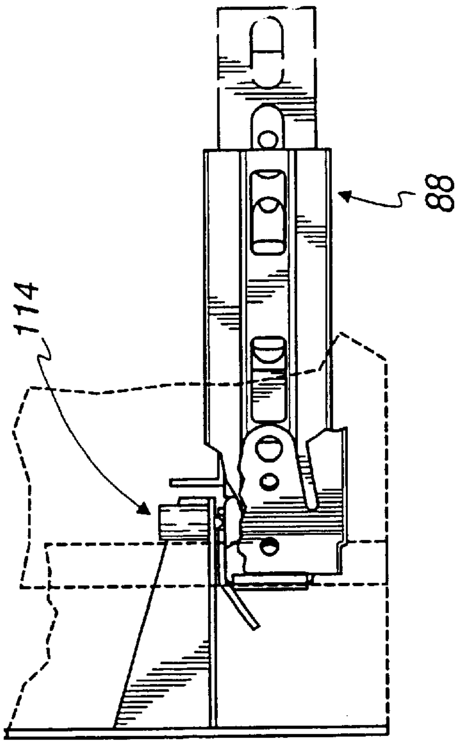
FIG. 16 is similar to FIG. 15 but in retracted or closed position.

Referring first to FIGS. 15–17, the lower latch assembly 112 includes a bullet pin assembly 114 and a latch plate 116. The latch plate 116 is formed with a flat surface 118, attached or secured directly to the horizontal frame member 80 and a ramped surface 120. The flat surface 118 is formed with an aperture 122 for latching the bullet pin assembly 114 as generally shown in FIG. 17. The bullet pin assembly 114 includes a bullet pin 124, spring loaded by way of a spring 126, as best shown in FIG. 17. In a latched position as shown in FIG. 17, the bullet pin 124 is biased downwardly into the aperture 122.

The tension of the spring 126 is selected such that a relatively small horizontal force on the lower front housing portion 39 causes the bullet pin 124 to move upwardly and compress the spring 126, thus unlatching the bullet pin assembly 114 from the latch plate 116, as generally shown in FIG. 15. The ramped surface 120 on the latch plate 116 causes the bullet pin 124 to move upwardly, thus compressing the spring 126, as the lower front housing portion 39 is moved toward a closed position as shown in FIGS. 10 and 11. The compression forces of the spring 126 bias the bullet pin 124 downwardly as the top of the bullet pin 124 slides across the flat surface 118 of the latch plate 116. Once the bullet pin 124 is over the aperture 122 in the latch plate 116, the bullet pin 124 is biased downwardly as shown in FIG. 17, latching the right lower portion of the lower front housing position 39 to the door chassis 76.

Figure 20:
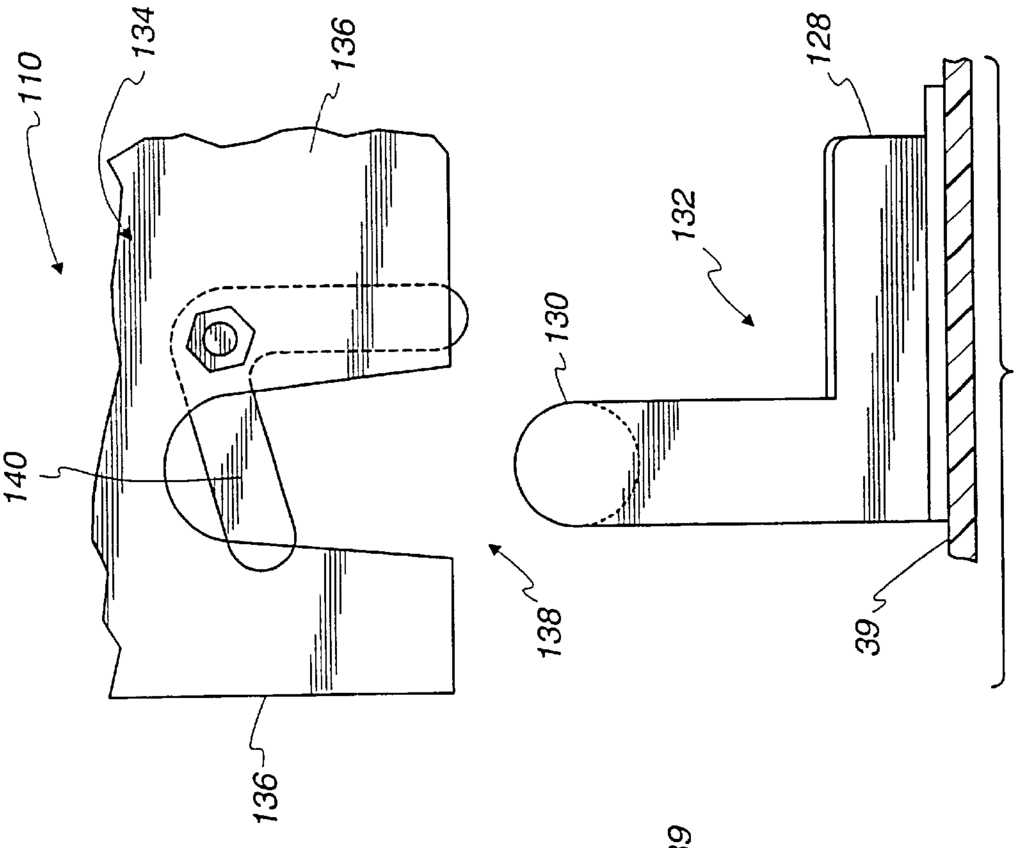
FIG. 20 is similar to FIG. 19 but in an unlatched position and the door partially opened.
Figure 19:
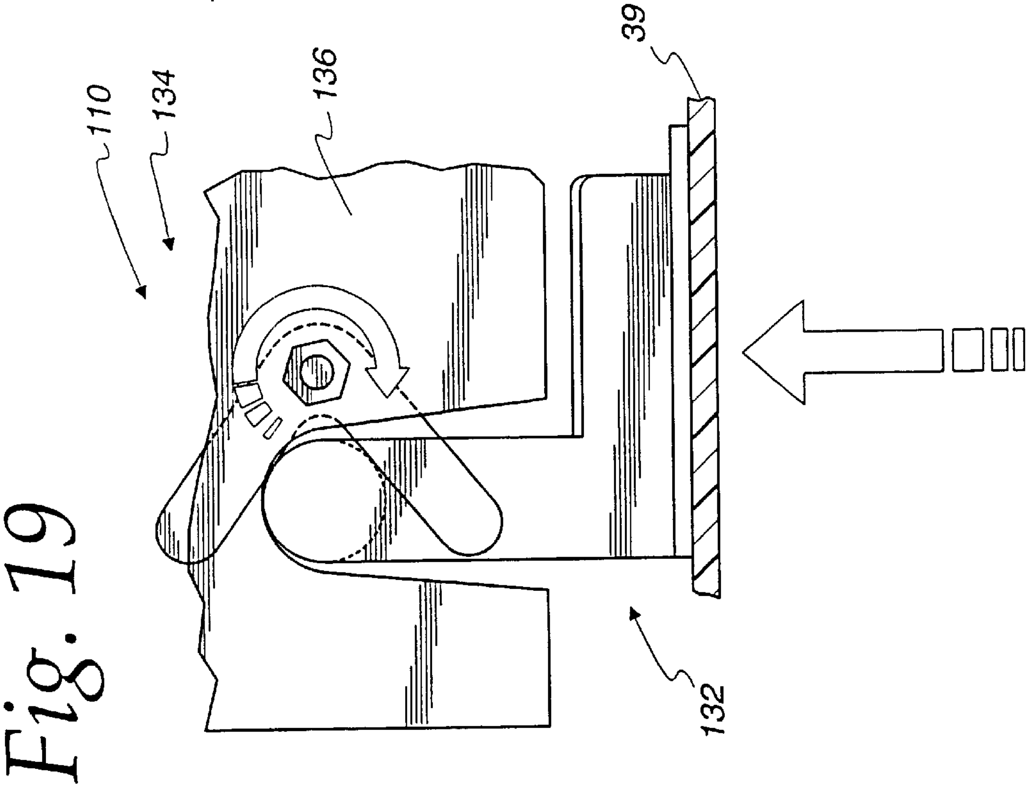
FIG. 19 is partial elevational view with portions of the gaming machine removed illustrating the upper door latch assembly in a latched position.

FIGS. 19–20 illustrate the upper latch assembly 110. The upper latch assembly 110 is used to latch the upper right side of the lower front housing portion 39 in a closed position for example as shown in FIG. 1. The upper latch assembly 110 must be latched in order to allow the door chassis assembly 76 to be pulled out to an extended position as shown in FIGS. 13 and 14. The upper latch assembly 110 is similar to a car door latch assembly and includes pair of parallel spaced apart L-shaped brackets 128 and a pin 130 extending there between forming a bracket assembly 132. The bracket assembly 132 is rigidly attached to the interior of the lower front housing portion 39 access door.

A latch subassembly 134 is formed on the interior of the right side housing portion 35. The latch subassembly 134 includes a plate 136, rigidly attached to the right housing portion 35 and a generally U-shaped slot 138. The pin 130 on the bracket assembly 132 is adapted to be received in the U-shaped slot 138 as generally shown in FIG. 19. A latching mechanism formed from a pivotally mounted L-shaped member 140 is used to capture the pin 130 in the slot 138 in a latched position as generally shown in FIG. 20. When the L-shaped member 140 is rotated counter-clockwise, as generally shown in FIG. 20, the pin 130 is released to allow the lower front housing portion 39 to be unlatched.

Figure 18:
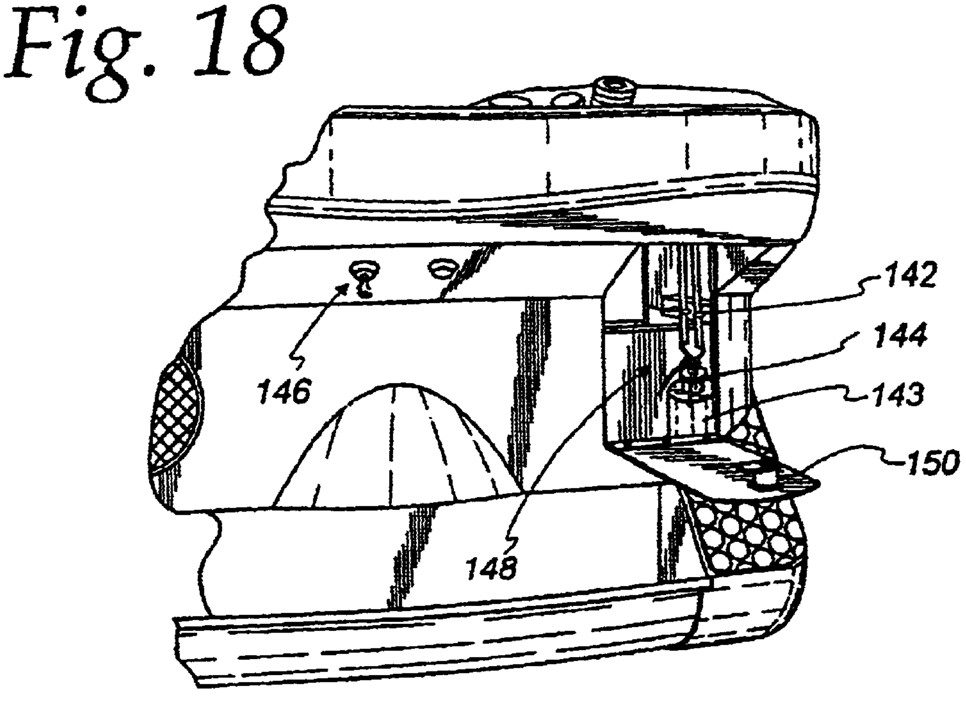
FIG. 18 is a partial perspective view of the gaming machine housing illustrated in FIG. 1, illustrating an access door in an open position and revealing a portion of the upper door latch assembly.

Normally the L shaped member 140 is spring loaded in a clockwise direction to force the L shaped member into the position as generally shown in FIG. 19. A release cable 142 (FIG. 18) is attached to one end of the L shaped member 140. The release cable 142 is used to overcome the spring force in order to rotate the L shaped member 140 in a counter clockwise position as generally shown in FIG. 20 in order to release the pin 130. The other end of the release cable 142 may be attached to a solenoid 143 (FIG. 18). In a normal position, the solenoid 143 is not powered and thus does not tension the release cable 142. When electrical power is applied to the solenoid 143, a plunger 144 on the solenoid 143 is retracted to place tension on the release cable 142 in order to rotate the L shaped member 140 (FIG. 20) to enable the lower front housing portion 39 to be unlatched.

The solenoid 143 (FIG. 8) may be key operated. For example, as shown in FIG. 18, a key operated switch 146 may be located on the housing 30. Thus, when a key is inserted and turned to the on position, the solenoid 143 is powered up in order to enable the upper latch assembly 110 to be released. However, use of the solenoid 143 requires that the machine be connected to a source of electrical power.

In the event of a power failure or need to access the machine when no power is available, a portal 148 (FIG. 18) may be provided on the front portion of the lower front housing portion 39, adjacent the solenoid 143. As shown in FIG. 18 the portal 148 may be is hinged at the bottom and may be secured at the top with a simple key latch 150. During conditions when electric power is not available, the portal 148 is simply opened and tension manually placed on the release cable 142 to unlatch the upper latch assembly 110.

Remote Bet Button

In order to improve the player comfort, an extendable bet button, generally identified with the reference numeral 152 (FIGS. 22–24), provides additional player comfort. For example, as illustrated in FIG. 21, a player is shown at a gaming machine in a first conventional position. In this position, the player is forced to sit at arm's length to the gaming machine controls. The extendable bet button 152 allows the player to lean back and play the game while in a more comfortable position as shown in FIG. 22.

Figure 23:
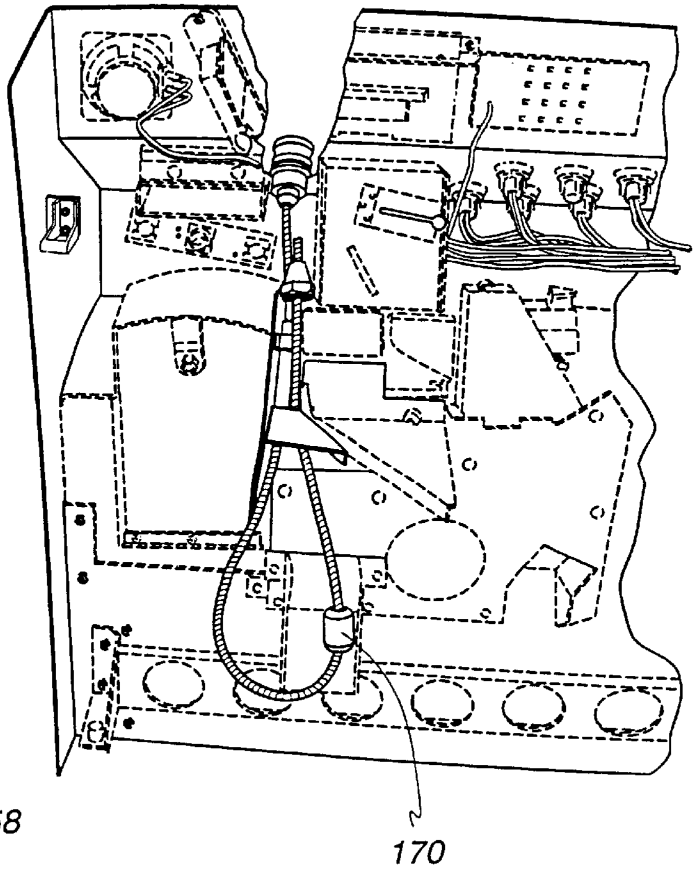
FIG. 23 is a partial view of the interior side of the door in phantom illustrating a bet button in a retracted position.

The extendable bet button 152 is disposed on the interior side of the lower front housing portion 39, as generally shown in FIGS. 22 and 23. FIG. 22 shows the extendable bet button 152 in a fully retracted position while FIG. 23 shows the extendable bet button in an extended position.

The extendable bet button 152 includes a conventional push button switch 154 (FIG. 24) and a rearwardly extending reduced diameter cylindrical member 156. The cylindrical member 156 is provided with a through hole for receiving an electrical cable 158 that is attached to the switch 154. The electrical cable 158 may be provided as an armored cable to minimize wear. A generally cylindrical grommet 160 is carried by the surface 48 (FIGS. 1–3) on the lower front housing portion 39. The cylindrical grommet 160 includes a central aperture 162 for receiving the cylindrical member 156, as generally shown in FIG. 23.

Figure 24:
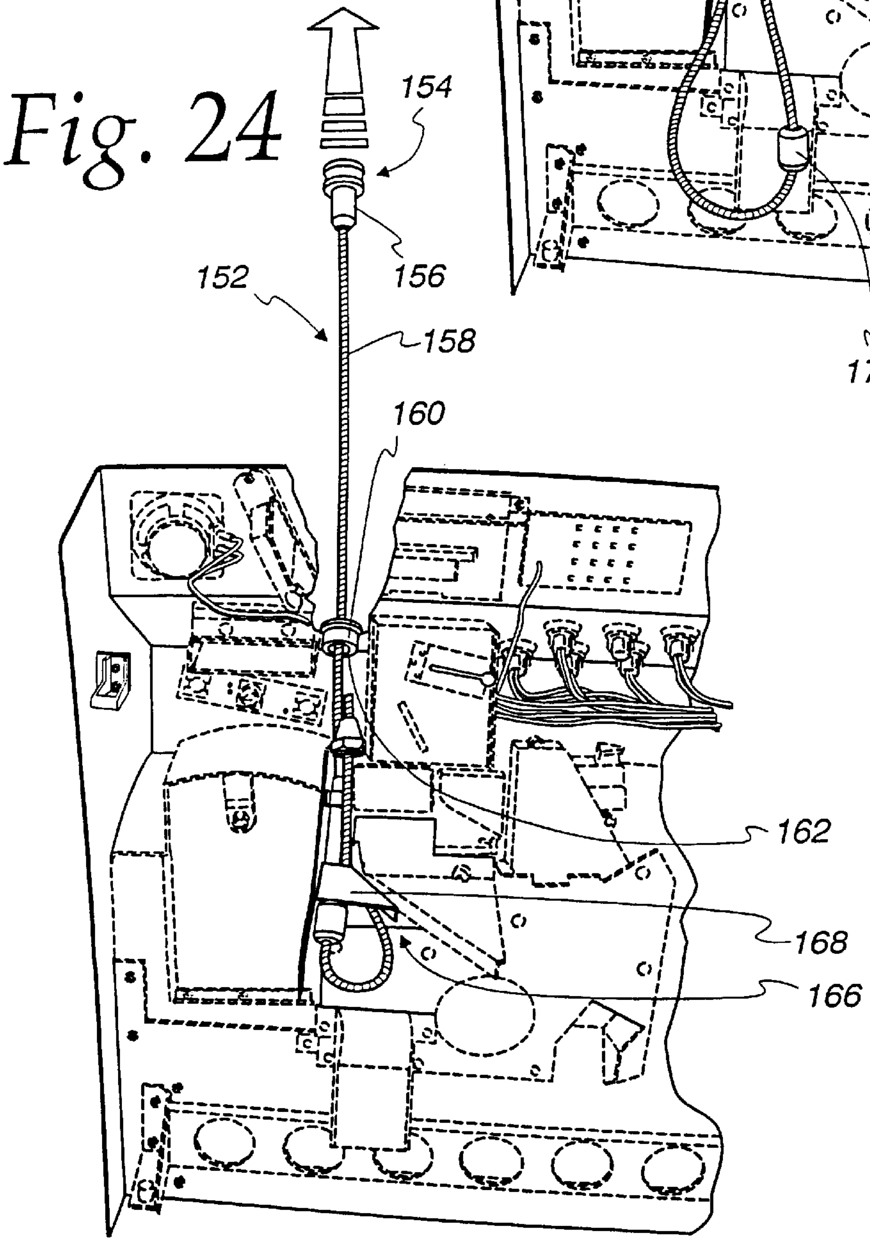
FIG. 24 is similar to FIG. 23 but showing the bet button in an extended position.

The cable 158 is attached on one end to the game controls (not shown) in a conventional manner. In order to prevent the extended bet button 154 from being disconnected from the gaming machine, a stop assembly 166 is provided. The stop assembly 166 includes a bracket 168 defining an access area which enables the cable 158 to freely slide through. A generally cylindrical weight 170 is attached around the armored cable 158 at a distance selected to prevent axial forces from being placed on the electrical connection to the gaming machine in an extended position. The cylindrical weight 170 has a relatively larger diameter than the cable 158. In a normal position, as shown in FIG. 23, the weight 170 rests in the interior of the lower front housing portion 39. When the bet button 154 is in an extended position as shown in FIG. 24, the diameter of the weight 170 is much larger than the access through the bracket 168 thus preventing further movement of the armored cable 158 stop as generally shown in FIG. 24.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A gaming machine comprising:

a housing comprising a front housing portion having an aperture of a first dimension therein;

a grommet disposed within the aperture in the front housing portion;

gaming machine electronics associated with the housing;

a remote bet button adapted to move between an extended position and an unextended position, the remote bet button comprising a push button switch disposed within a cylindrical member, wherein the push button switch allows a user to make a wager on a game played on the gaming machine and wherein the cylindrical member comprises a first portion having a second dimension smaller than the first dimension and a second portion having a third dimension larger than the first dimension, the remote bet button adapted to fit in the aperture in abutment with the grommet when the remote bet button is in the unextended position;

an armored cable comprising a first end coupled to the push button switch and extending through the aperture in the front housing portion and a second end coupled to the gaming machine electronics, the armored cable moving through the aperture and having a length allowing the remote bet button to be moved from the unextended position to the extended position;

a stop assembly disposed within the housing, the stop assembly comprising a bracket defining an access area through which the armored cable passes and a weight attached around the armored cable and disposed between the bracket and the second end of the armored cable, wherein a dimension of the weight is larger than a dimension of the access area of the bracket;

a video display associated with the housing and adapted to display images associated with the game played on the gaming machine;

a value accepting device associated with the housing and adapted to accept value to be wagered on an outcome of the game played on the gaming machine; and a control panel associated with the housing that allows a user to control the game played on the gaming machine.

2. A gaming machine comprising:

a housing comprising a front housing portion having an aperture of a first dimension therein;

a seating unit associated with the housing, the seating unit enabling a user to sit in an upright position in which the housing is within reach of the user and enabling the user to sit in a reclined position in which the housing is not within reach of the user;

gaming machine electronics associated with the housing;

an extendable bet button that allows the user to initiate play of a game played on the gaming machine from the reclined position, the extendable bet button comprising a portion having a second dimension larger than the first dimension, the extendable bet button adapted to move between an unextended position and an extended position;

a cable coupled to the extendable bet button and extending through the aperture in the front housing portion, the extendable bet button being operatively coupled to the gaming machine electronics, the cable having a length allowing the extendable bet button to be moved from the unextended position to the extended position, the cable moving through the aperture in the front housing portion when the extendable bet button is moved between the unextended position and the extended position;

a video display associated with the housing and adapted to display images associated with the game played on the gaming machine; and a value accepting device associated with the housing and adapted to accept value to be wagered on an outcome of the game played on the gaming machine.

3. The gaming machine of claim 2, wherein the extendable bet button comprises a switch.

4. The gaming machine of claim 2, wherein the cable comprises an armored cable.

5. The gaming machine of claim 4, further comprising a weight disposed within the housing and coupled to the armored cable.

6. The gaming machine of claim 4, further comprising a bracket disposed within the housing and adapted to engage the weight when the extendable bet button is in the extended position.

7. A gaming machine comprising:

a housing including an aperture of a first dimension;

gaming machine electronics associated with the housing;

a control panel associated with the housing and operatively coupled to the gaming machine electronics, the control panel including a number of input devices that allow a user to control a game played on the gaming machine;

a cable coupled to the gaming machine electronics and extending through the aperture;

a push button switch coupled to the gaming machine electronics through the cable, wherein the cable has a length that allows the push button switch to be moved from an unextended position to an extended position, the push button switch allowing the user to initiate the game played on the gaming machine without having to utilize the control panel;

a cable retention unit associated with the housing, the cable retention unit comprising a bracket defining an access area through which the cable passes and a weight attached to the cable and disposed between the bracket and the gaming machine electronics, wherein a dimension of the weight is larger than a dimension of the access area of the bracket;

a video display associated with the housing and adapted to display video images associated with the game played on the gaming machine; and a value accepting device associated with the housing and adapted to accept value to be wagered on an outcome of the game played on the gaming machine.

8. The gaming machine of claim 7, wherein the push button switch is disposed within a cylindrical member comprising a first portion having a second dimension smaller than the first dimension and a second portion having a third dimension larger than the first dimension, the cylindrical member adapted to fit in the aperture when the push button switch is in an unextended position.

9. The gaming machine of claim 7, wherein the cable comprises an armored cable.

10. A gaming machine comprising:

a housing comprising a front housing portion having an aperture of a first dimension therein;

gaming machine electronics associated with the housing;

an extendable bet button that allows the user to initiate play of a game played on the gaming machine, the extendable bet button comprising a portion having a second dimension larger than the first dimension, the extendable bet button adapted to move between an unextended position and an extended position;

a cable coupled to the extendable bet button and extending through the aperture in the front housing portion, the extendable bet button being operatively coupled to the gaming machine electronics, the cable having a length allowing the extendable bet button to be moved from the unextended position to the extended position, the cable moving through the aperture in the front housing portion when the extendable bet button is moved between the unextended position and the extended position; and a value accepting device associated with the housing and adapted to accept value to be wagered on an outcome of the game played on the gaming machine.

11. The gaming machine of claim 10, wherein the extendable bet button comprises a switch.

12. The gaming machine of claim 10, wherein the cable comprises an armored cable.

13. The gaming machine of claim 12, further comprising a weight disposed within the housing and coupled to the armored cable.

14. The gaming machine of claim 12, further comprising a bracket disposed within the housing and adapted to engage the weight when the extendable bet button is in the extended position.

* * * * *